F. M. PETERS AND W. H. HUNGERFORD.
CUTTING MACHINE.
APPLICATION FILED JAN. 2, 1920.

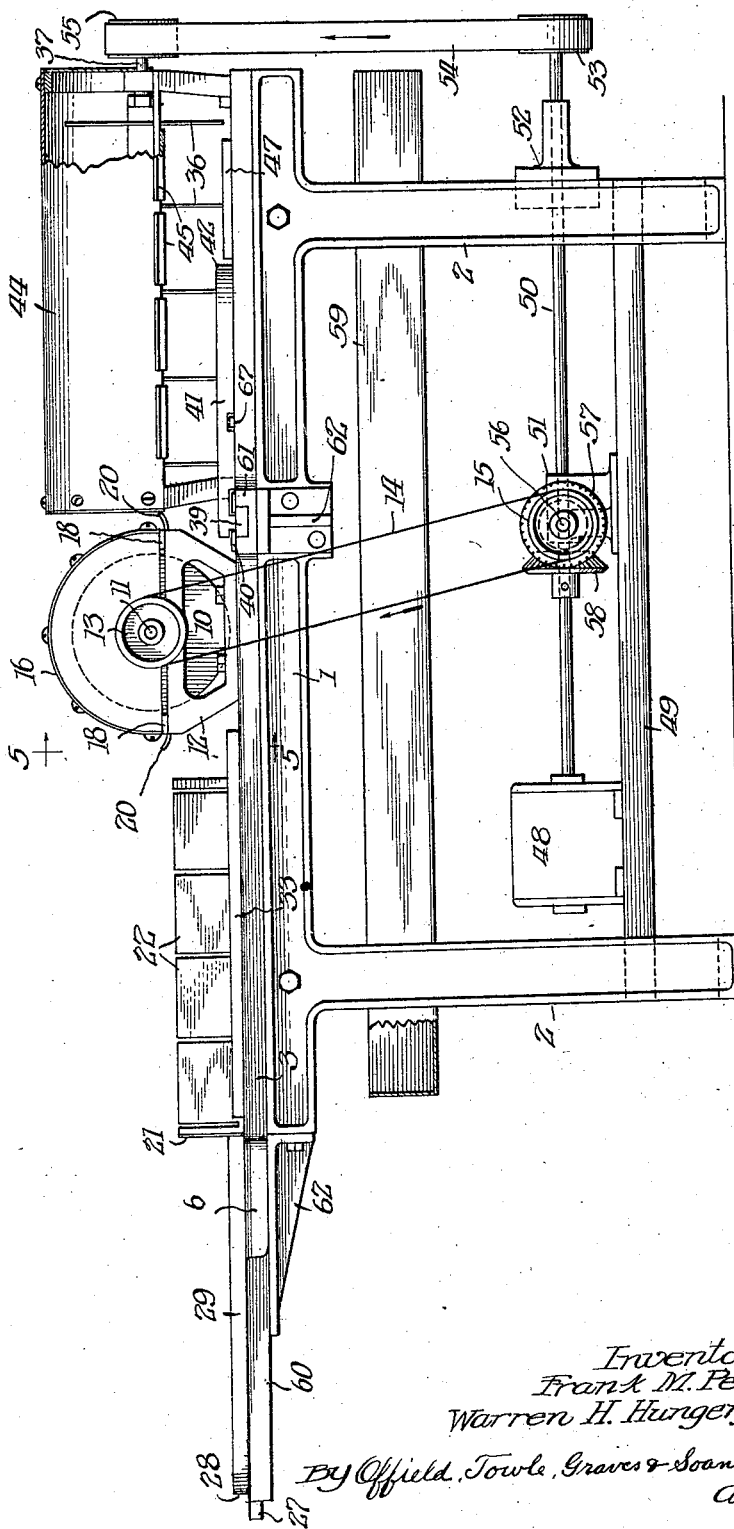

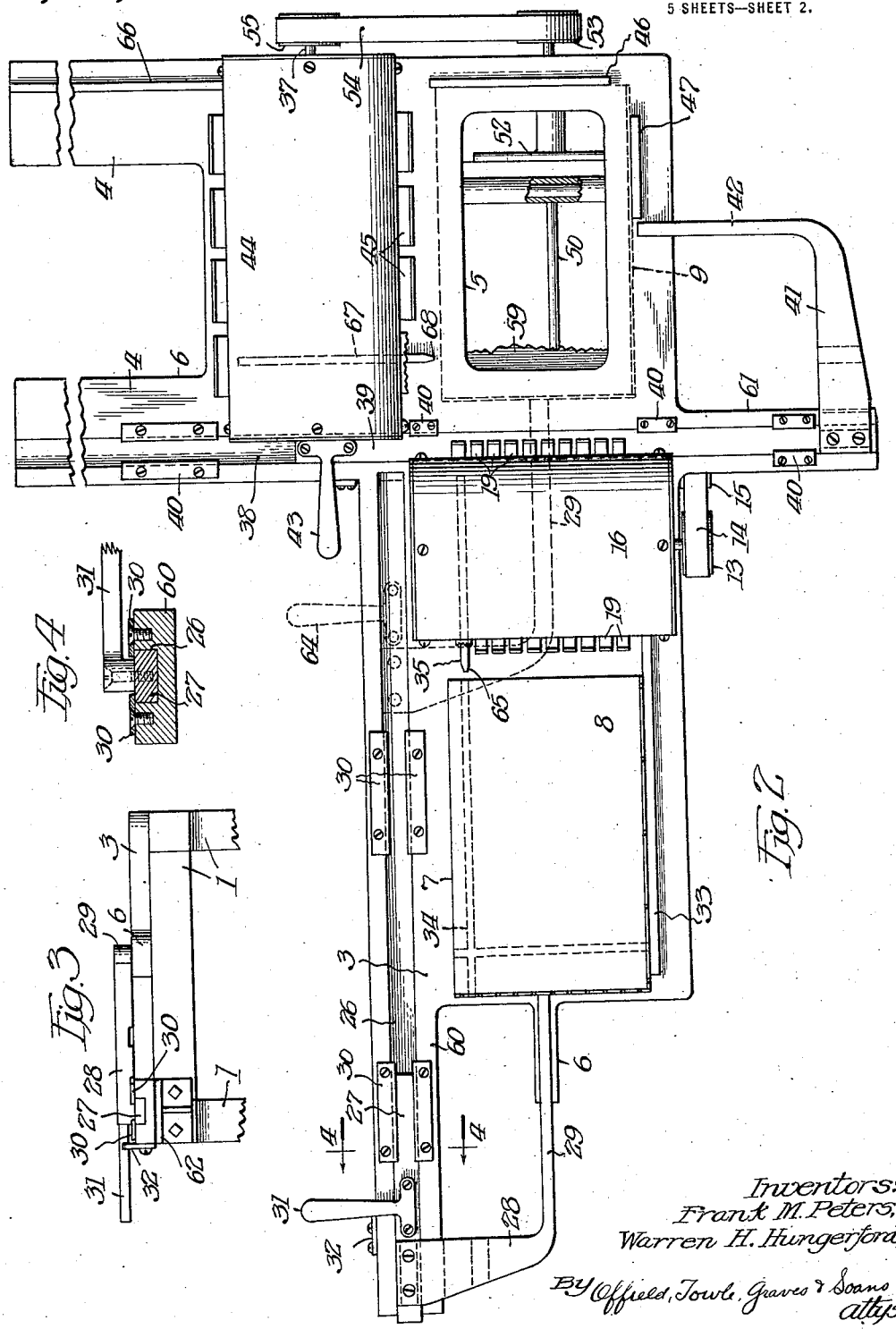

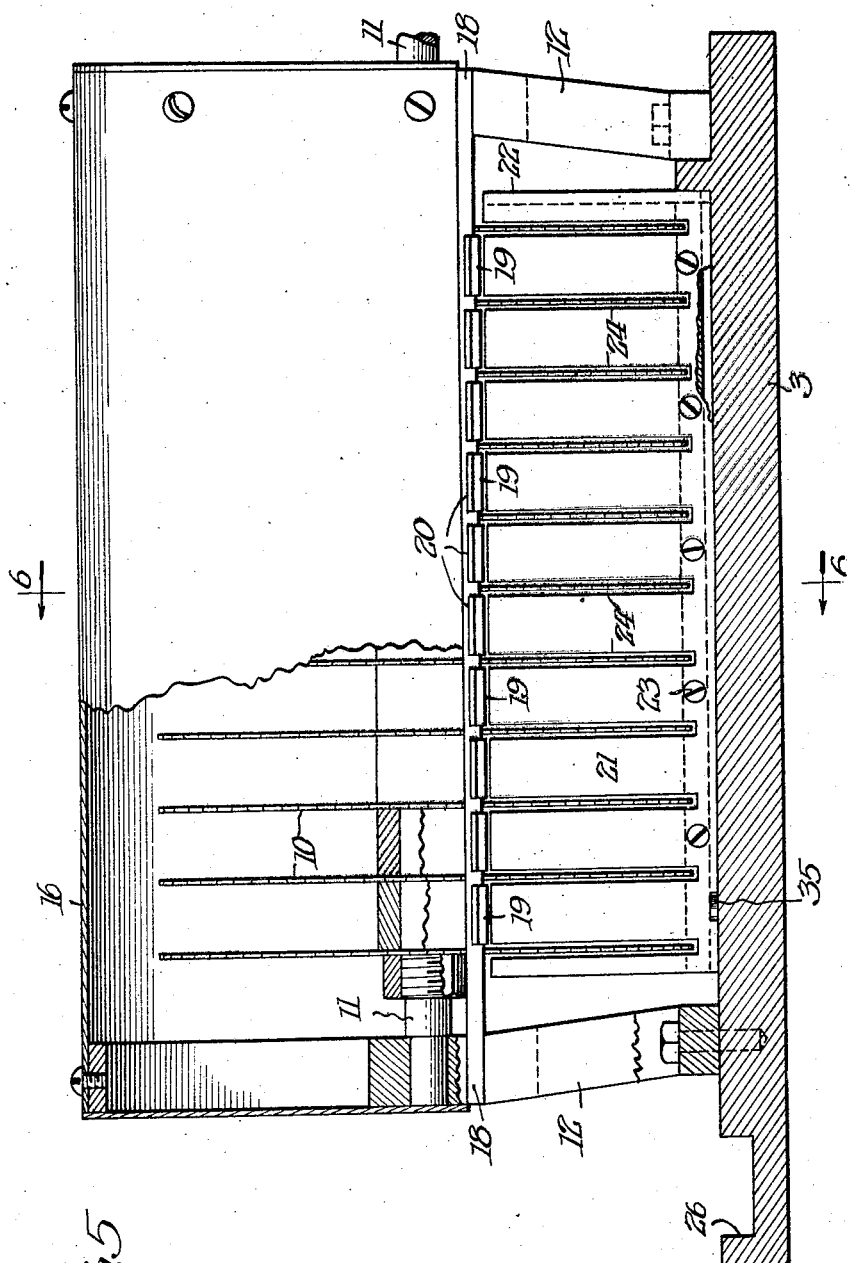

1,417,562.

Patented May 30, 1922.
5 SHEETS—SHEET 4.

Inventor.
Frank M. Peters,
Warren H. Hungerford,
By Offield, Towle, Graves & Soans
Attys.

F. M. PETERS AND W. H. HUNGERFORD.
CUTTING MACHINE.
APPLICATION FILED JAN. 2, 1920.

1,417,562.

Patented May 30, 1922.

Inventors:
Frank M. Peters,
Warren H. Hungerford,
By Offield, Towle, Graves & Loane
attys.

UNITED STATES PATENT OFFICE.

FRANK M. PETERS AND WARREN H. HUNGERFORD, OF CHICAGO, ILLINOIS, ASSIGNORS TO PETERS MACHINERY COMPANY, OF CHICAGO, ILLINOIS, A CORPORATION OF ILLINOIS.

CUTTING MACHINE.

1,417,562. Specification of Letters Patent. Patented May 30, 1922.

Application filed January 2, 1920. Serial No. 348,908.

*To all whom it may concern:*

Be it known that we, FRANK M. PETERS and WARREN H. HUNGERFORD, both citizens of the United States, residing at Chicago, in the county of Cook and State of Illinois, have invented certain new and useful Improvements in Cutting Machines, of which the following is a specification.

Our invention has reference more particularly to machines such as are used for cutting sheets or layers of pastry in two directions so as to divide same into a plurality of wafers.

In making wafers, such for example as the commonly known "sugar" wafers, and similar articles, the material from which the wafers are made is usually prepared in sheets or layers, and two of these sheets or layers are pasted together with a filling or icing and then cut into the required wafer size.

The principal objects of our invention are to provide a machine of this character which is adapted to cut sheets or layers of wafer material into wafers, more rapidly and conveniently than heretofore; to simultaneously cut a plurality of layers of wafer material; to cut a stack of layers or sheets of wafer material successively on intersecting lines; to automatically regulate the relative position of the layers of wafer material with respect to the cutters so that the proper dimensions of wafers are afforded, and wafers of uniform size thereby produced; to hold the layers of wafer material against displacement during the cutting operation; to regulate the adjustment of the layers of wafer material after a cutting operation, to insure proper positioning thereof to be operated upon by the successive wafer cutters; to provide guides for affording the proper relative movement of the layers of wafer material during operation thereupon, by the cutters; to provide means conveniently accessible to an operator adjacent the machine for successively passing the layers of wafer material through the cutters; and, in general, to provide an improved machine of this character which is simple and inexpensive, and which may be readily operated by an ordinary workman.

On the drawings, Fig. 1 is a side view of a machine embodying our invention;

Fig. 2 is a top or plan view thereof;

Fig. 3 is a fragmentary view looking at the left hand end of the machine as shown in Fig. 1;

Fig. 4 is an enlarged sectional view on the line 4—4 of Fig. 2;

Fig. 5 is an enlarged fragmentary sectional view taken on the line 5—5 of Fig. 1, a portion of the saw guard being broken away to disclose details of construction;

Fig. 8 is an enlarged top view of the tray which we employ in connection with this machine, to carry the layers of wafer material during the sawing or cutting operations.

Figure 6:
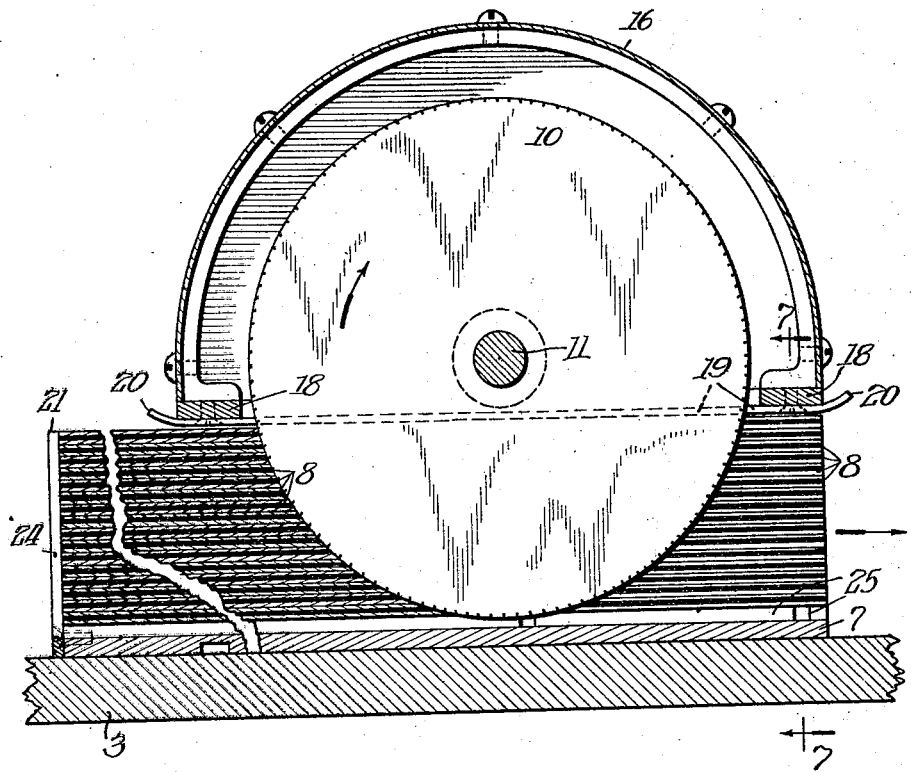
Fig. 6 is a sectional view on the line 6—6 of Fig. 5.
Figure 7:
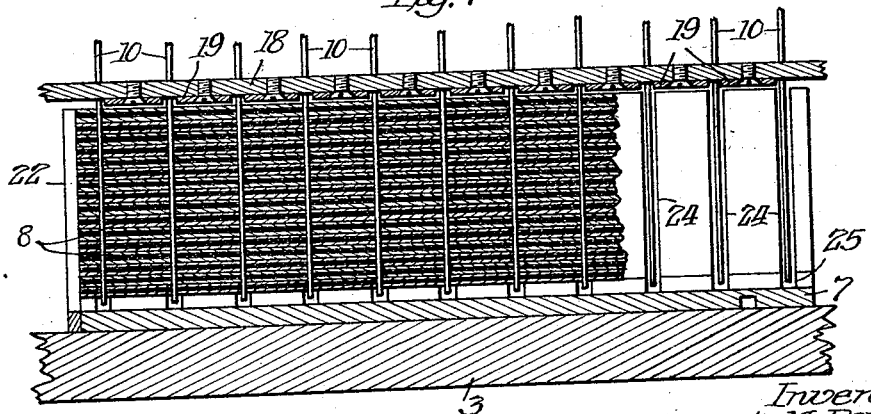
Fig. 7 is a sectional view on the line 7—7 of Fig. 6.

As shown on the drawings, the machine has a table or supporting frame 1 mounted on suitable legs or standards 2, said frame being constructed with a top of angular form comprising a portion 3 extending lengthwise of the machine and a portion 4 extending laterally from one end thereof, as shown in Fig. 2, for a purpose hereinafter indicated, and said top may be cut away, if desired, at 5 and 6, to afford lighter weight and save material.

A tray 7 is utilized to carry layers 8 of wafer material and icing or filling through the machine during the cutting operations and is first placed in the position in which it is shown in Figs. 1 and 2, and then moved from this position along the longitudinal portion 3 of the table to the position indicated by dotted lines at 9 in Fig. 2, after which it is moved laterally over the lateral extension 4 of the table top.

Intermediate of the initial position of the tray 7, and the position indicated at 9, is a cutting device comprising a plurality of circular saws 10, which are fixed on a transverse shaft 11, in proper spaced relation, to divide the layers 8 of wafer material into strips of the desired width of the finished wafers. The shaft 11 is journaled in brackets 12 which are bolted to the longitudinal portion 3 of the table, one at each side thereof, and each has a suitable bearing for the shaft 11. This shaft extends at one side of the machine, beyond the bearing, and has a belt wheel 13 fixed thereon and connected by the belt 14 with a drive pulley 15 mounted below the table top. Each of the brackets 12 is elongated at the top and the corresponding ends thereof are connected together by straps or bars 18, spaced above the top of and extending transversely across the table portion 3, and strips 19 are provided between each adjoining pair of saws 10 and secured to the straps or bars 18, as shown in Fig. 6. The ends of these straps 19 project beyond the bars 18 and are turned up, as indicated at 20, to facilitate insertion of trays of wafer material thereunder. A guard or shield 16 in the form of a semi-cylindrical shell is mounted on the brackets 12 so as to enclose the upper portions of the saws 10.

The tray is provided at one end and at one side with the side walls 21 and 22 respectively, which may be detachable and secured to the bottom of the tray by cap screws 23, and the end wall 21 is slotted vertically at 24 so that when the tray is placed in position to pass under the saws 10, the said slots 24 are in alignment with the saws 10 and enable the tray to pass completely thereunder without the end wall 21 interfering with the saws. The bottom of the tray is also formed with longitudinal grooves 25 corresponding to the slots 24 so that the saws may project slightly below the bottom of the tray and insure the cutting of the lowermost layers of wafer material by the saws 10.

For moving the tray under and beyond the saws 10 from the position shown in Fig. 2, there is a groove 26 at one side of the longitudinal portion 3 of the table, in which a bar 27 is arranged to slide, said bar being provided with an arm 28 having a pusher stem 29 extending therefrom so as to engage against the rear end of the tray. This pusher stem 29 is of suitable width to pass between two adjoining saws 10 and engages against the rear end wall 21 of the tray, between two adjoining slots 24. The bar 27 is retained in the groove 26 by plates 30 which may be secured at intervals along the groove 26 and overhang the opposite sides thereof, as shown, and there is a handle 31 secured to the bar 27 for reciprocating the latter in the groove 26. The arm 28 and handle 31 are both constructed with a somewhat narrow neck portion where secured to the bar 27, so as to pass between the retaining plates 31. A stop 32 at the outer end of the longitudinal portion 3 of the table is positioned to be engaged by the handle 31 when the latter is withdrawn sufficiently to enable the tray 7 to be placed in the initial position ahead of the saws 10, and the inner end of the pusher stem 29 and a strip 33 at one side of the table serve as stops, against which the tray is inserted to insure the proper initial position thereof.

At the opposite side of the tray 7 from the wall 22, which latter is placed adjacent the strip 33, the bottom of the tray is grooved longitudinally at 34 on the under side, and there is a rib 35 on the top of the table which engages the groove 34 as the tray is moved under the saws 10, and serves, together with the strip 33, to hold the tray in proper alignment with the saws. The end of the rib 35 is preferably rounded or tapered as at 65, to facilitate engagement thereof with the groove 34 as the tray is advanced by the pusher stem 29.

For sawing the wafers into the desired lengths, there are a plurality of saws 36 mounted on a shaft 37 adjacent the position 9 to which the tray is moved after passing under the saws 10, and the side wall 22 of the tray 7 has slots 70, and the bottom of the tray has transverse grooves 71 properly spaced apart and located so as to be in alignment with the saws 36 when the tray is moved thereunder. There is a transverse groove 38 in the top of the table, in which a bar 39 slides, said bar being retained therein by the strips 40 which overhang the edges of the groove, and this bar has an arm 41 at one end, with a pusher stem 42 which is arranged to engage against the side of the tray when the latter is moved to the position indicated at 9, and move the tray under the saws 36. The bar 39 and pusher arm 42 connected therewith are manually operated by a handle 43 which is normally positioned at the angle between the portions 3 and 4 of the table, adjacent the point where the handle 31 comes to rest after moving the tray from the initial position to the position 9, thus enabling the operator to conveniently operate the handle 43 and its pusher stem after the operation of the handle 31 and its pusher stem 29. The handle 43 and the arm 41 are connected with the rod 39 by means of a narrow neck which is adapted to pass between the retaining strips 40 at opposite sides of the groove 38.

The saws 36 are covered by a guard 44, which is similar to and mounted in the same manner as the saw guard 16, and there are strips 45 mounted in and extending between the saws 36 in the same manner as the strips 19, said strips 45, however, being wider, owing to the increased distance between the saws 36.

For locating the tray 7 in the proper position with reference to the saws 36 after passing under the saws 10, we have provided a stop 46, against which the end of the tray engages when pushed to the position 9 by the operation of the handle 31, and the table 3 may also be provided with a flange or rib 47 to serve as a guide for the side of the tray.

For operating the saws 10 and 36, there is a motor 48, mounted on a support 49 under the table top and connected with a shaft 50 which extends longitudinally of the machine and is journaled in bearings 51 and 52. A pulley 53 is secured on the outer end of the shaft 50 and connected by means of a belt 54 with a pulley 55 on the shaft 37 of the saws 36, for operating the latter. At a point intermediate of the ends of the shaft 50, a laterally extending shaft 56 is mounted, and has a bevel gear 57 fixed thereon, in mesh with a bevel gear 58 on the shaft 50, and this shaft 56 has the pulley 15 fixed on the outer end thereof.

A pan 59 may be mounted on the legs or standards 2 of the machine, and extend under the top 1 so as to collect the sawdust and fragments of the wafer material. The longitudinal portion 3 of the table preferably does not extend the full length of the machine, but has an extension 60 at one side for the groove in which the bar 27 reciprocates, and there is a similar extension 61 at the side of the machine for the groove 38 in which the bar 39 reciprocates. These extensions are preferably reinforced by brackets 62 secured to the end and side respectively, of the top of the machine. An extension 63 is also provided at the end of the top to support the pusher stem 29 when the latter is in the retracted position shown in Fig. 2.

In the operation of the machine, the tray 7 is filled, preferably to the upper edges of the walls 21 and 22, with layers 8 of wafer material of substantially the same dimensions as the bottom of the tray. The tray is then placed in the initial position, as shown in Fig. 2, with one side engaging against the rib 33 and one end engaging against the end of the pusher stem 29. Assuming that the motor 48 is in operation and the saws 10 and 36 rotated, the handle 31 is moved to the position indicated by dotted lines at 64 in Fig. 2, in which position the tray with the strips of wafer material therein, resulting from the operation of the saws 10, comes to rest against the stop or rib 46. In passing under the saws 10, the ribs 33 and 35 serve to hold the tray in proper alignment with the saws, and the strips 19 between the saws 10 are positioned close to the top of the uppermost layers of wafer material in the tray 7, and serve to hold the stack of layers in place in the tray and prevent lifting movement or dislocation thereof due to the operation of the saws 10.

After the tray reaches the position 9, the operator then grasps the lever 43, and moves the tray with the strips of wafer material therein, under the saws 36, which divide the strips of wafer material into the proper lengths desired for the wafers. The guides 46, 66 and 67 serve to hold the tray 7 in proper alignment with the saws 36, during the sawing operation, and the strips 45 serve to hold the wafer material down into the tray against displacement during the operation of the saws 36.

Although we have described our machine as constructed and used for the purpose of cutting wafers, it is to be understood that it may be used for cutting materials other than wafer material, and we are also aware that various changes and modifications may be made without departing from the principle of our invention, the scope of which is to be determined by the appended claims.

We claim as our invention:

1. In a device of the class described, the combination of a frame having two spaced sets of cutting devices, a holder for material to be operated on, and independently operable propelling means for moving the holder through each set of cutters.

2. In a device of the class described, the combination of a frame, two spaced sets of cutters, a holder for material to be operated on adapted to be moved over the surface of the frame so as to subject material therein successively to the two sets of cutters, and a separate propelling mechanism for each set of cutters co-operatively arranged so that one propelling mechanism delivers the holder to the other propelling mechanism.

3. In a machine of the class described, the combination of a slideway having angularly related portions, a carrier for a plurality of layers of material, independently operable reciprocating means on each angular portion and adapted to be successively operated so as to move the carrier first over one angular portion and then over the other angular portion of the slideway, and cutters mounted adjacent each angular portion of the slideway and adapted to cut all the layers of material in the holder as the latter is moved thereby.

4. In a machine of the class described, the combination of a slideway comprising angularly related portions, each having a multiple saw mounted thereover, a carrier for a plurality of layers of material, and mechanism having controlling means therefor within the angle of the intersecting portions of the slideway and operable by said controlling means for successively moving the holder along the angular portions of the slideway under the multiple saws thereof.

5. In a device of the class described, the combination of a frame having angularly disposed sections forming an L-shaped slideway, a set of cutting devices on each section, a holder movable over the slideway so as to successively pass the cutting devices, propelling mechanism for moving the holder along the slideway, and means within the angle formed between the two sections, for controlling the operation of the propelling mechanism.

6. In a machine of the class described, the combination of a plurality of cutters, independent means for moving the material to be operated upon successively to each cutter, and an operating handle for each of said independent means suitably arranged so that the starting position of one handle is adjacent the stopping position of the other handle.

7. In a device of the class described, the combination of a frame, a set of cutting devices on the frame, a holder slidable on the frame, a guideway parallel with the path of movement of the holder, a member mounted to operate in the guideway, and means on said member adapted to engage the rear end of the holder to move the latter through the cutting devices.

FRANK M. PETERS.
WARREN H. HUNGERFORD.